United States Patent
Corn

(10) Patent No.: US 12,067,702 B1
(45) Date of Patent: Aug. 20, 2024

(54) METHODS AND DEVICES FOR INSPECTING TUBES

(71) Applicant: COLUMBIA INSURANCE COMPANY, Omaha, NE (US)

(72) Inventor: Joel Corn, Ringgold, GA (US)

(73) Assignee: Columbia Insurance Company, Omaha, NE (US)

( * ) Notice: Subject to any disclaimer, the term of this patent is extended or adjusted under 35 U.S.C. 154(b) by 415 days.

(21) Appl. No.: 17/386,803

(22) Filed: Jul. 28, 2021

Related U.S. Application Data

(60) Provisional application No. 63/057,636, filed on Jul. 28, 2020.

(51) Int. Cl.
*G06T 7/00* (2017.01)
*G05B 19/418* (2006.01)
*G06K 7/14* (2006.01)

(52) U.S. Cl.
CPC ...... *G06T 7/0004* (2013.01); *G05B 19/41875* (2013.01); *G06K 7/143* (2013.01)

(58) Field of Classification Search
CPC . G06T 7/0004; G05B 19/41875; G06K 7/143
See application file for complete search history.

(56) References Cited

U.S. PATENT DOCUMENTS

| | | | | |
|---|---|---|---|---|
| 6,382,510 B1 * | 5/2002 | Ni | ...................... | G01N 21/8851 235/462.1 |
| 8,340,392 B2 * | 12/2012 | Kim | ...................... | G01B 11/24 700/109 |
| 9,116,134 B2 * | 8/2015 | Satou | ...................... | B21C 51/00 |
| 10,899,138 B2 * | 1/2021 | Sones | ................... | B41J 2/2054 |

* cited by examiner

*Primary Examiner* — Gregory M Desire
(74) *Attorney, Agent, or Firm* — Ballard Spahr LLP

(57) ABSTRACT

A system for inspecting a tube can comprise a first image acquisition device that is configured to capture at least one image of the first end of the tube. A second image acquisition device can be configured to capture at least one image of at least a portion of the outer surface of the circumferential wall of the tube. A first conveyor can be configured to position the tube so that the first image acquisition device can capture the at least one image of the first end of the tube and the second image acquisition device can capture the at least one image of at least a portion of the circumferential wall of the tube. A computing device can be configured to determine, based on the at least one image from the first image acquisition device or the at least one image from the second image acquisition device, if the tube has a flaw.

19 Claims, 7 Drawing Sheets

METHODS AND DEVICES FOR INSPECTING TUBES

CROSS-REFERENCE TO RELATED APPLICATION

This application claims priority to and the benefit of the filing date of U.S. Provisional Patent Application No. 63/057,636, filed Jul. 28, 2020, which is incorporated herein by reference in its entirety.

FIELD

This application is directed to devices, systems, and methods for inspecting tubes, particularly for use in yarn manufacturing.

BACKGROUND

Yarn produced in extrusion processes such as bulk continuous filament (BCF) is typically wound around paper tubes. However, paper tubes are not durable and are not suited for reuse.

Moreover, yarn is typically produced and rolled to form a yarn cone or yarn package. Yarn packages conventionally lack any unique identifier and are, consequently, difficult to track for purposes such as quality control or diagnostics.

SUMMARY

Disclosed herein, in some aspects, is a system for inspecting a tube, such as, for example, a tube around which yarn can be wound. The system can comprise a first image acquisition device that is configured to capture at least one image of the first end of the tube. A second image acquisition device can be configured to capture at least one image of at least a portion of the outer surface of the circumferential wall of the tube. A first conveyor can be configured to position the tube so that the first image acquisition device can capture the at least one image of the first end of the tube and the second image acquisition device can capture the at least one image of at least a portion of the outer surface of the circumferential wall of the tube. At least one processor can be in communication with the first and second image acquisition device. A memory can be in communication with the at least one processor. The memory can comprise instructions that, when executed by the at least one processor, cause the at least one processor to determine, based on the at least one image from the first image acquisition device or the at least one image from the second image acquisition device, if the tube has a flaw.

In another aspect, a method of inspecting a tube, the tube having a first end, an opposing second end spaced along a longitudinal axis, and a circumferential wall extending between the first and second ends, is disclosed. The method can comprise capturing a first image of the first end of a tube; capturing a second image of at least a portion of the circumferential wall of the tube; receiving, using at least one processor, the first image and the second image; and detecting, using the at least one processor, at least one flaw based on at least one of the first image and the second image.

In another aspect, a method can comprise receiving a tube; applying an identifier to the tube; and providing the tube to a supply of production tubes.

In another aspect, a system for inspecting a tube, the tube having a first end, an opposing second end spaced along a longitudinal axis, and a circumferential wall extending between the first and second ends is disclosed. The system can comprise a first inspection device that is configured to detect a shape of the first end of the tube and a second inspection device that is configured to capture a profile of at least a portion of an outer surface of the circumferential wall of the tube. A first conveyor can be configured to position the tube so that the first inspection device can detect a shape of the first end of the tube and the second inspection device can capture the profile of the at least a portion of the outer surface of the circumferential wall of the tube. At least one processor can be in communication with the first and second inspection devices. A memory can be in communication with the at least one processor. The memory can comprise instructions that, when executed by the at least one processor, cause the at least one processor to determine, based on the shape of the first end of the tube or the profile of the at least a portion of the outer surface of the circumferential wall of the tube, if the tube has a flaw.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Figure 1:
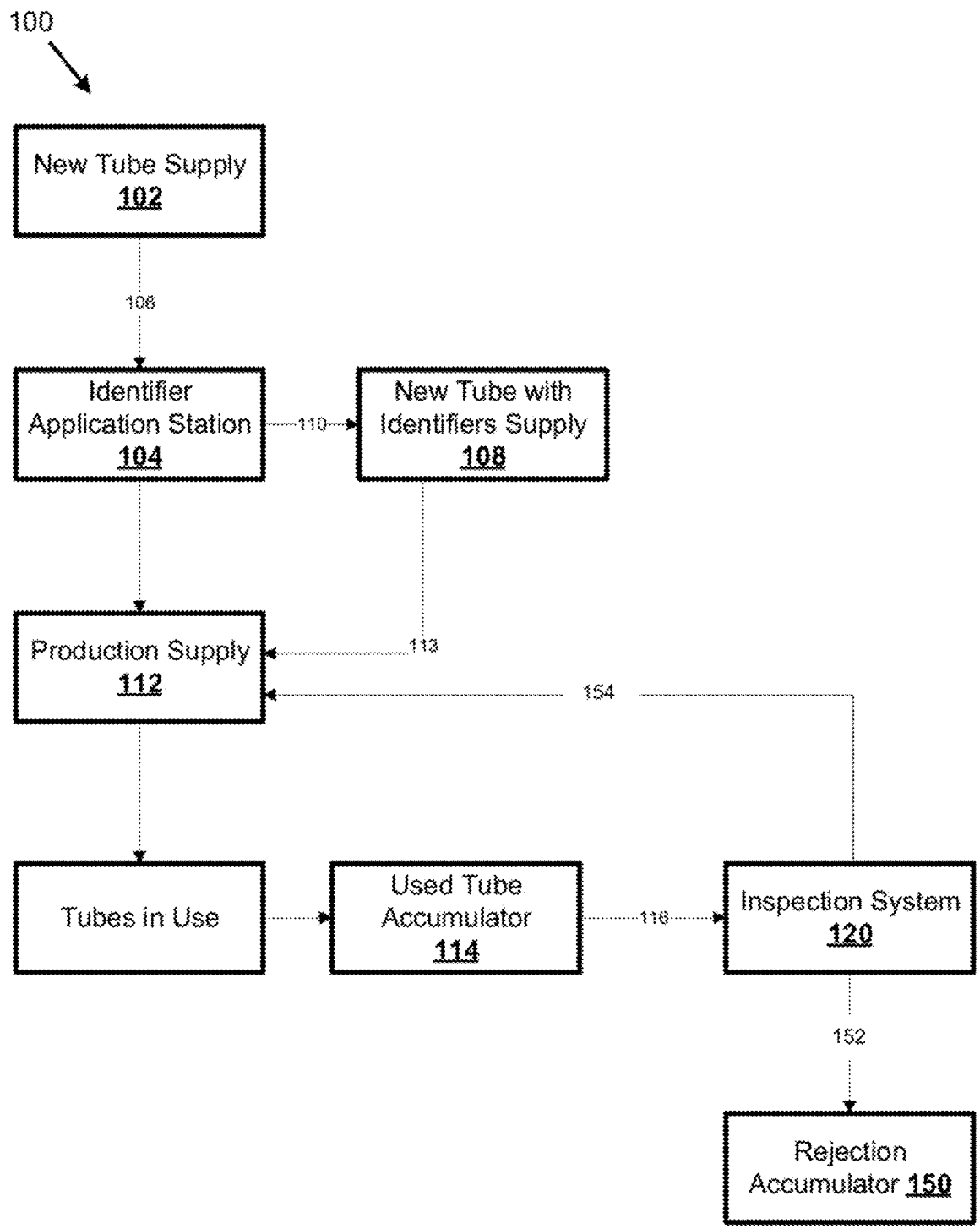
FIG. 1 is a schematic of a system in accordance with embodiments disclosed herein.

The present invention can be understood more readily by reference to the following detailed description and appendix, which include examples, drawings, and claims. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a camera" can include two or more such cameras unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

It is contemplated that tracking devices, such as barcodes or radio frequency identification (RFID) tags on yarn tubes can provide benefits for tracking product and can provide diagnostic data and data for process improvement. Such tracking devices can be prohibitively expensive for single use tubes such as paper tubes. Accordingly, more durable tubes, such as polymer or metal tubes, can be used instead of paper tubes. However, even such durable (e.g., polymer or metal) tubes can be subject to wear and eventual exhaustion. Accordingly, it is contemplated that an inspection system can be used to determine when a tube is no longer usable and exhausted. Although it is contemplated that paper tubes can have limited life, it is contemplated that the systems and methods described herein can be configured for use with tubes of any material (paper, polymer, metal, or other suitable material).

Although the tubes herein are shown and described as cylindrical, it should be understood that the disclosed tubes need not be perfectly cylindrical. For example, it is contemplated that the disclosed tubes (or portions of the disclosed tubes) can have a cylindrical profile, a frustoconical profile, a tapered profile, a flanged bobbin profile, or any other suitable profile. Further, although the tubes are shown as hollow, it is further contemplated that the tubes can be solid.

Figure 2:
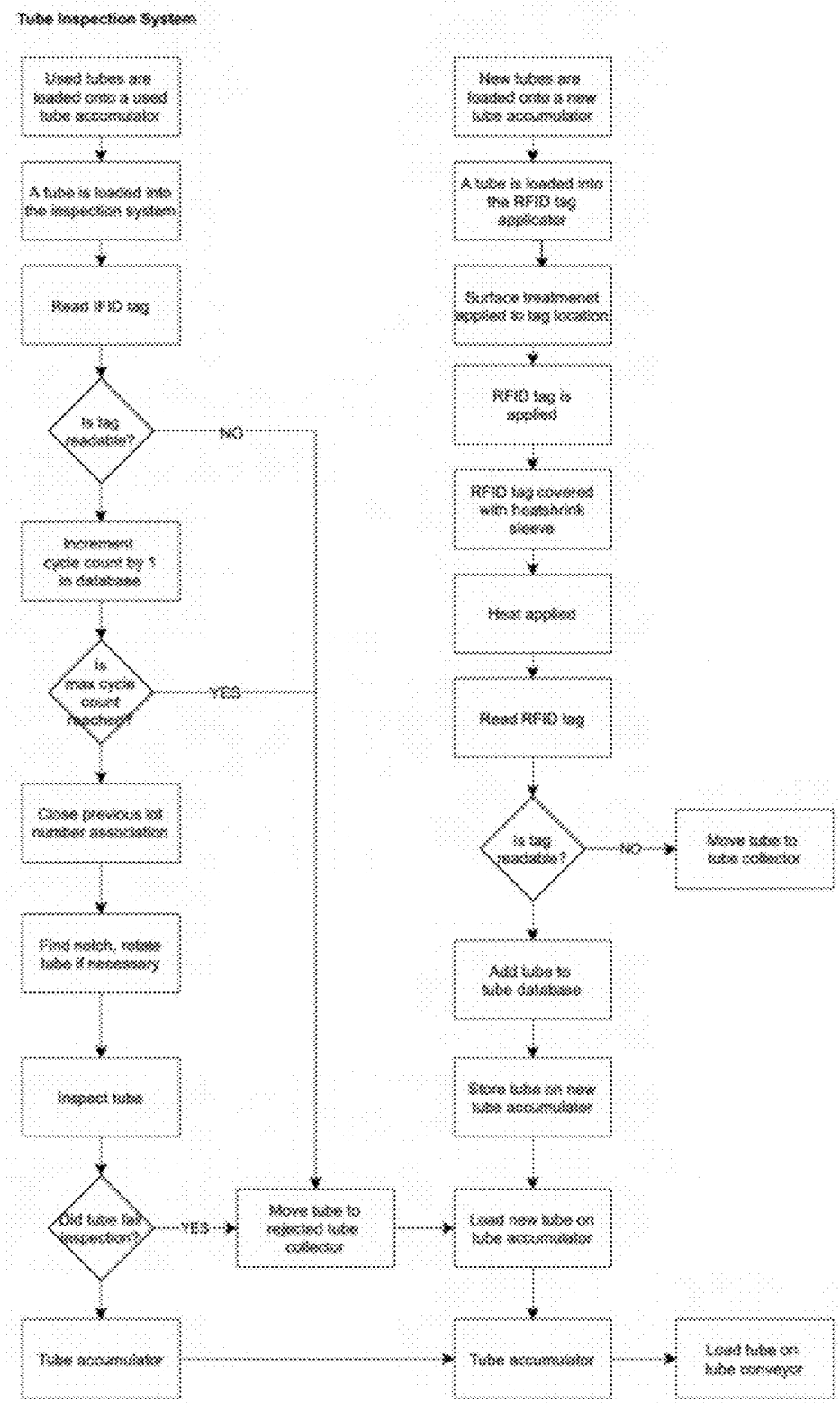
FIG. 2 is a flow chart for one embodiment of operation of the system of FIG. 1.

Referring to FIGS. 1 and 2, a tube system 100 can comprise a supply 102 of tubes 101 that are new (unused) and lack identifiers. The supply 102 of new tubes can be provided in a hopper, accumulator, or other bin that can feed the new tubes to an identifier application station 104, for example, via a conveyor 106.

The identifier application station 104 can be configured to apply a unique identifier 105 (FIG. 3) to each tube. For example, in some aspects, the unique identifier can be an optically recognizable pattern (e.g., a barcode, QR code, numerical identifier, or other suitable pattern), or RFID chip. In some aspects, the identifier application station 104 can be configured to print the optically recognizable identifier on the tube. In further aspects, the optically recognizable pattern can be an independent component (e.g., a sticker or a printed tag that is coupled to the tube). In these aspects, it is contemplated that the identifier application station 104 can comprise one or more applicators or dispensers that are configured to apply the unique identifiers to the tubes. In some optional aspects, the identifier 105 can comprise a first barcode that extends longitudinally along the tube, and a second barcode that wraps around the tube at an angle (i.e., aligned with a helix that extends around the surface of the tube). Said angle can be, for example, about 45 degrees or about 90 degrees.

In some aspects, the identifier 105 can be positioned on the exterior of the tube. At least a portion of the tube can be shrink-wrapped to inhibit wear or removal of the identifier 105, to prevent yarn from undesirably catching on the identifier, and, optionally, to couple the identifier to the tube. Accordingly, in some aspects, the identifier (e.g., an RFID tag) can be applied to the tube. The identifier can be covered with heat shrink, and heat can be applied to the tube to couple the heat shrink to the tube. In further optional aspects, the identifier can be positioned on the interior of the tube or embedded within the tube.

The identifier 105, and, thus, the tube 101, can be associated with a profile. The profile can include the number of uses of the tube. In further aspects, the tube, via its identifier, can be associated with one or more of the following: the specific yarn (or product) presently on the tube, the yarn that has previously been on the tube, BCF systems that have provided yarn to the tube, creel and creel locations that the tube has been used on, manufactured articles that have been produced with yarn from the tube, or any other information that can be useful for tracking use of the tube.

Once the identifier application station applies the unique identifier to the tube, the identifier application station can attempt to read the identifier. If the identifier cannot be read, the tube can be rejected and provided to a rejected tube collector. If the identifier can be read, the tube can be added to a tube database, and the tube can then be provided to a new tube with identifiers supply 108 (e.g., an accumulator), optionally, via a conveyor 110. The new tube with identifiers supply can be configured to selectively provide the tubes with identifiers into a production supply 112 via a conveyor 113.

The production supply 112 can be provided to winders. For example, operators can manually transport the tubes from the production supply 112 to winders, where product (e.g., yarn) can be wound around the tubes to form product packages. In further aspects, automated guided vehicles (AGVs) or conveyors can deliver the tubes to the winders. Once product packages have been formed, the product on the tubes can be used in various applications, including, for example, tufted articles (e.g., carpets or artificial turf) or woven articles. Although not described in detail herein, use of tubes for forming yarn packages and using the yarn packages to form textile articles are well known in the art. At some or each stage of use (e.g., positioning on the winder, removing from the winder, providing the tube to the creel, etc.) the identifier can be read to track the tube as well as the product associated therewith.

After the product packages have been exhausted, the remaining tubes can be provided to a used tube accumulator 114 (i.e., an accumulator for used tubes), for example, manually via operator or automatically via automated guided vehicles (AGVs). The used tube accumulator 114 can be a bin that provides the tubes to a conveyor 116 (e.g., via gravity feed).

Figure 3:
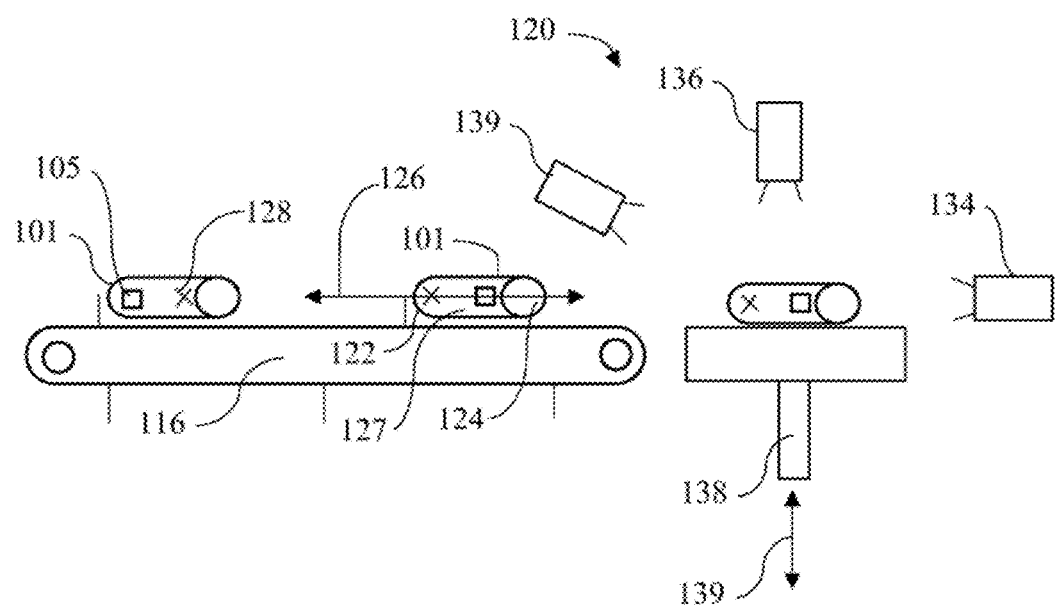
FIG. 3 is a side schematic view of an inspection system for use with the system as in FIG. 1.
Figure 4:
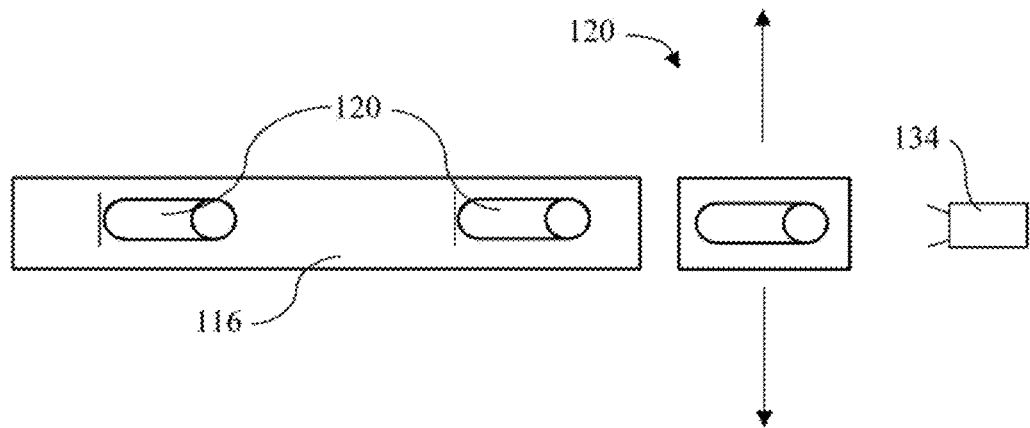
FIG. 4 is a top schematic view of the inspection system of FIG. 3.
Figure 5:
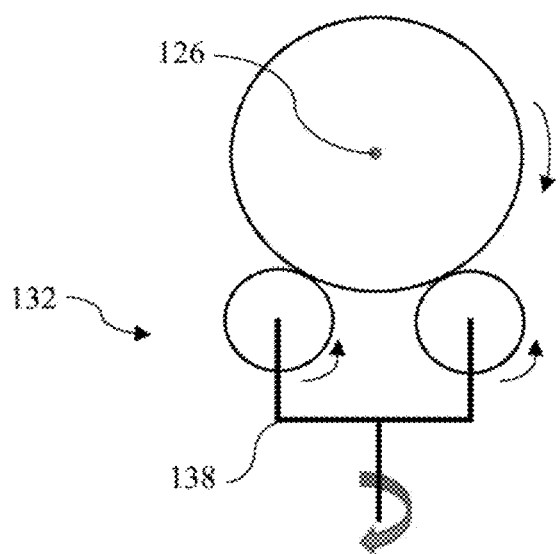
FIG. 5 is a side schematic view of an inversion assembly and rotator of the inspection system of FIG. 3.
Figure 7:
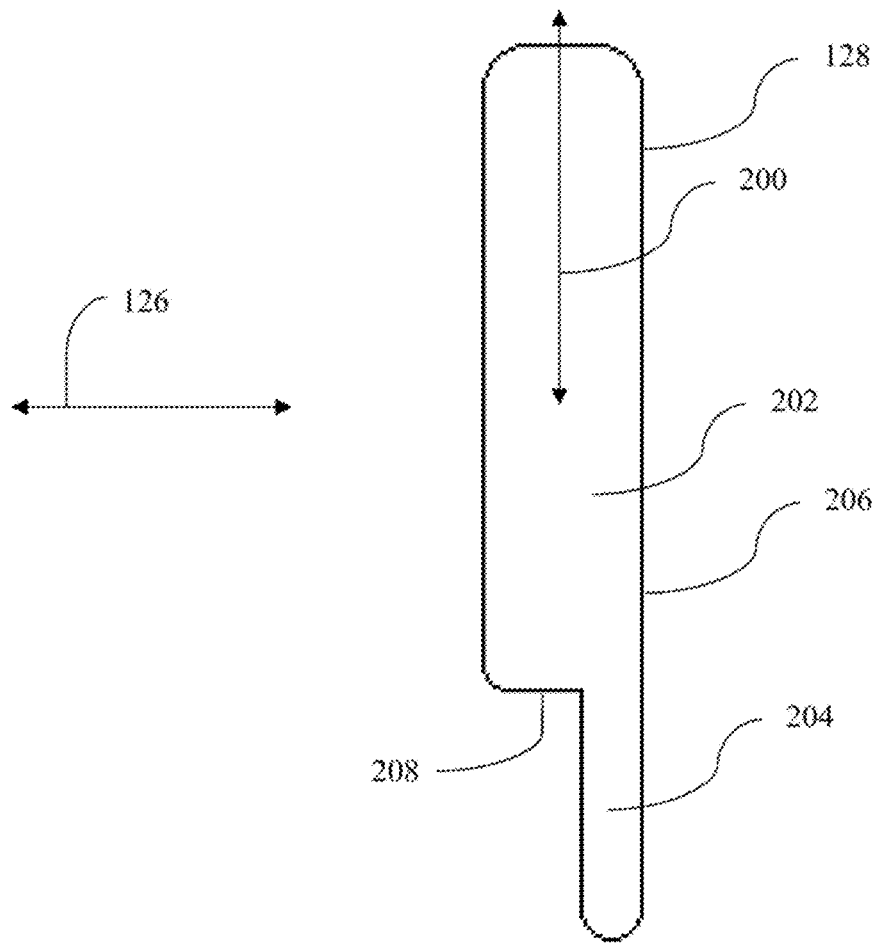
FIG. 7 is a schematic of a profile of a notch of a tube.

Referring also to FIGS. 3, 4, and 7, the conveyor 116 can feed an inspection system 120. The tubes 101 can have a first end 122, a second end 124 spaced along a longitudinal axis 126, and a circumferential wall 127. In some optional aspects, the tubes 101 can comprise a notch 128. The notch 128 can be configured to receive and/or engage yarn and permit tearing/cutting of the yarn upon completion of a yarn package. It is known that conventional winders can have a notch or other yarn tearing structure. However, these conventional notches can get clogged up over repeated use and ultimately fail. Conventionally, therefore, these notches require routine cleaning, therefore adding to labor costs and production down time. In providing notches on the tubes, such clogging and routine cleaning can be avoided. In some aspects, the notch 128 can be provided at a position that is offset from the center of the tube relative to the longitudinal axis 126 toward the first end 122. In some aspects, the notch 128 can be defined by a cutout that extends through the entire wall thickness of the tube. The notch can be elongate relative to a curved axis 200 that extends around the surface of the tube (perpendicular to the longitudinal axis 126 of the tube). That is, in some exemplary aspects, the axis 200 along which the notch extends can have a profile that corresponds to a profile of an adjoining portion of a circumferential surface of the tube. The notch 128 can define a wide portion 202 and a narrow portion 204. The wide portion 202 and narrow portion 204 can be aligned along a shared edge 206. An edge of the wide portion 202 that extends from the narrow portion 204 can define a tearing edge 208 against which yarn can optionally be torn.

The inspection system can comprise an identifier reader 130. For example, the identifier reader 130 can be an RFID reader that is configured to (e.g., properly spaced from the tube to) read the RFID chip that is coupled to the tube. In further aspects, the identifier reader can be a laser scanner, camera, other device that is configured to read an optical indicator (e.g., QR code, barcode, printed numerical identifier, etc.), or combinations thereof. In some aspects, the inspection system can comprise a rotator 132, such as a rotational actuator, that is configured to rotate the tube about its longitudinal axis. In some optional aspects, the rotator 132 can comprise at least one roller (optionally, a pair of rollers) that is configured to bias against the tube and rotate the tube via frictional engagement between the tube and the roller(s). The tube can, for example, rest on the one or more rotatable rollers. In further optional aspects, the rotator 132 can comprise grips that bias against or clamp opposing longitudinal ends 122, 124 of the tube, and the grips can rotate to rotate the tube. The rotator 132 can be configured to rotate the tube until the identifier reader (e.g., optical reader) is aligned with the identifier. The inspection system 130 can initially detect the identifier 105 of the tube 101.

The inspection system 120 can be in communication with a computing device 1001 (FIG. 6) that can be configured to receive the identifier detected by the inspection system (from the tube). In response to receiving the identifier of the tube, the computing device can be configured to increase a use count (or cycle count) on the tube profile. The computing device can then determine the number of times that the tube has been used. The computing device can compare the number of times that the tube has been used to a threshold. The threshold can be set based on empirical data to prevent tubes past their usable life from causing failures due to overuse. Thus, if the number of uses surpasses a threshold, the inspection system 120 can reject the tube as further disclosed herein. In some exemplary aspects, optionally, plastic tubes can have a use threshold of 30 uses, 40 uses, or 50 uses (or other specified number of uses between 20 and 100 uses), metal tubes can have a use threshold of 100 uses, 125 uses, or 150 uses (or other specified number of uses between 50 and 200 uses), and paper tubes can have a use threshold of five or ten uses (or other specified number of uses between two and 20 uses). In further aspects, it is contemplated that paper tubes can be for single-use only.

The inspection system can further comprise at least one inspection device. For example, in some aspects, the at least one inspection device can comprise a first image acquisition device 134 that is configured to capture or form at least one image (or other geometrical representation) of an entire first longitudinal end (or substantially an entire first longitudinal end, for example, at least 90% of the exposed surface area of the first longitudinal end) of the tube. The image of the first longitudinal end can be captured so that the shape that the end defines can be determined. Thus, in some optional aspects, the outline of the tube end can be identified (e.g., tracing a circle corresponding to the profile of the first longitudinal end). In further optional aspects, outer and inner edges of the first longitudinal end can be identified from the image (or geometrical representation) of the first longitudinal end to define an annulus corresponding to the profile of the first longitudinal end. In some aspects, the image acquisition device can comprise a camera that is configured to capture images in the visible light, infrared, UV, or X-ray spectrum, or any combination thereof. In these aspects, the camera can be oriented and positioned to capture one or more images of the first longitudinal end of the tube.

Additionally, or alternatively, it is contemplated that the first image acquisition device can comprise a laser scanner. The laser scanner can be configured to collect a plurality of data points corresponding to locations on the tube that are scanned in 3D space. Optionally, it is contemplated that the plurality of data points can form a 3D point cloud. In some optional aspects, the point cloud can be stored as polar coordinates or Cartesian coordinates (e.g., as a .CSV file). In some aspects, the laser scanner can scan across the longitudinal end of the tube. In further aspects, the rotator 132 can be configured to rotate the tube about its longitudinal axis as the laser scanner continuously or intermittently scans to capture a plurality of data points on the longitudinal end of the tube. The plurality of collected data points can collectively form at least one image (or geometrical representation) of the longitudinal end of the device.

The inspection system can further comprise a second image acquisition device 136 that is configured to capture or form at least one image (or other geometric representation) of at least a portion of the outer surface of the circumferential wall of the tube. It is contemplated that the second image acquisition device 136 can be configured to capture a plurality of images as the rotator 132 rotates the tube. For example, the second image acquisition device 136 can capture a plurality of images at different rotational positions of the tube. Optionally, the plurality of images can collectively capture an entirety of the outer surface of the circumferential wall of the tube. It is contemplated that the second image acquisition device 136 can comprise a camera and/or laser scanner as further disclosed herein.

In some optional aspects, the inspection system can comprise a third image acquisition device 139 that is configured to capture or form at least one image (or other geometric representation) of an entire (or at least 90% of the exposed surface area of a) second longitudinal end of the tube. In these aspects, it is contemplated that the third image acquisition device 139 can operate in the same manner of the first image acquisition device 136 but be configured to capture images (or visual representations) of the second longitudinal end of the tube. Thus, it is contemplated that the third image acquisition device 139 can comprise a camera and/or laser scanner as further disclosed herein.

The computing device 1001 can be configured to determine if the tube has a flaw (e.g., a defect) based on the image(s)(or other geometric representation(s)) from the first image acquisition device, the second acquisition device, or the third acquisition device. For example, the processor can be configured to determine out-of-roundness of the tube or a portion thereof (e.g., out-of-roundness at one end). Optionally, the computing device 1001 can be configured to determine if the tube has a flaw (e.g., a defect) based on images or geometric representations from two or more of the first, second, or third acquisition devices. In further aspects, the flaw can be, for example, a crack or abrasion. In further aspects, for embodiments in which the tubes have respective notches, the flaw can be, for example, but not limited to, a misshapen notch, missing portions of the tube defining portions or edges of the notch, cracks in the notch, abrasion at edges of the notch, or trapped fragments of fiber in the notch.

To determine out of roundness, in some optional aspects, a mesh (optionally a two-dimensional mesh or a three-dimensional mesh) can be created from the image(s) of the tube. The points on the mesh can be compared to a pattern. For example, the end of the tube can form a circular shape that can be compared to a circle having the diameter of the tube. If any points on the mesh are outside of a threshold of the circle, the tube can be considered flawed for out-of-roundness. Likewise, to determine defects in the notch (or yarn trapped in the notch), from the image(s) of the notch, the profile (outline) of the notch can be converted to a series of points that can be compared to an ideal template. If any of the series of points are outside of a threshold of the ideal template, the notch can be considered flawed. It is further contemplated that cracks or abrasions can cause the changes in reflectivity on the surface of the tube can correspond to abrupt changes in light or darkness of the tube. The computing device 1001 can use image analysis to detect the abrupt color changes on the surface of the tube to detect cracks or abrasions. Although certain optional methods for determining flaws are disclosed herein, it should be understood that any suitable methods known in the art can be substituted for the disclosed methods.

Figure 8:
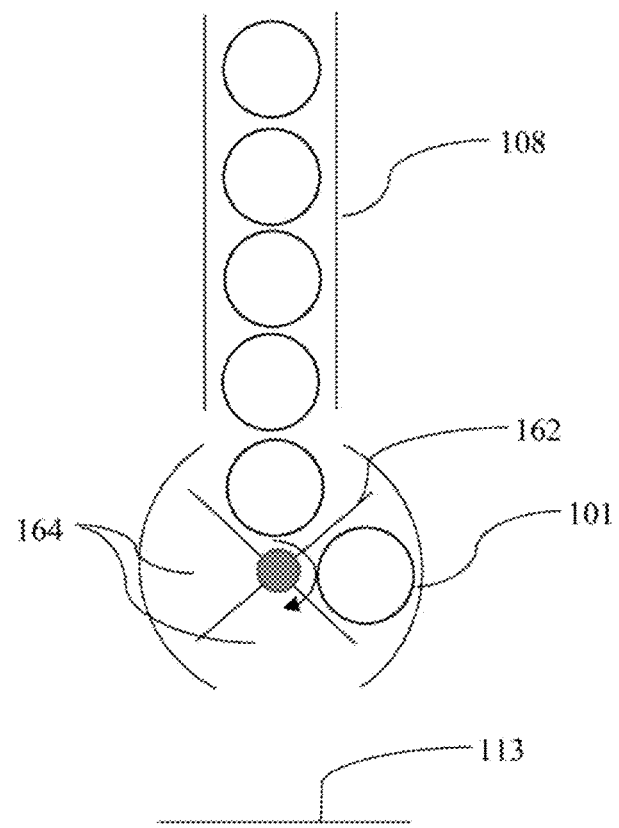
FIG. 8 is an exemplary tube supply (accumulator) and dispenser.

Upon detecting a flaw, the inspection system 120 can reject the tube. In some aspects, upon rejection, the inspection system can move the rejected tube into a rejection bin/accumulator 150 via a conveyor 152. Rejected tubes can be, for example, disposed of, recycled, or repaired and returned to the production supply. Optionally, upon rejecting the tube, the computing device 1001 can cause the system 100 to provide a new tube from the new tubes with identifiers supply 108 to the production supply to replace the rejected tube. For example, referring to FIG. 8, the new tube with identifiers supply 108 can feed a dispenser 160 that can be configured to dispense a single new tube at a time. In some optional aspects, the dispenser can comprise a rotating body 162 that defines a plurality of receptacles 164 that are sized to receive a single tube at a time. As the body rotates, a new tube 101 with an identifier at the outlet of the supply 108 can fall into an empty receptacle 164. As the body continues to rotate, the receptacle can drop the tube 101 through an opening onto the conveyor 113.

If no flaws are detected (and the tube is not above its use or cycle count), the inspection system can return the tube to the production supply 112 via a conveyor 154.

In some aspects, the inspection system can comprise an inversion assembly 138 that is configured to invert the orientation of (i.e., flip) the tube about a transverse axis 139 that is perpendicular to the longitudinal axis 126. In some aspects, the inversion assembly 138 can comprise a platform that is configured to rotate about a vertical axis with the tube thereon. In further aspects, the inversion assembly can comprise a claw or other gripping apparatus that is configured to invert the orientation of the tube. By inverting the orientation of the tube, the first image acquisition device can be configured to capture an image of the entire second longitudinal end of the tube, and the third image acquisition device 140 can optionally be omitted.

As stated herein, in some aspects, the tube can comprise a notch that is offset from the center of the tube along the longitudinal axis. Using the image(s) of the outer surface of the circumferential wall of the tube, the computing device 1001 can be configured to determine which end of the tube the notch is on. It is contemplated that the tubes passing inspection can be provided to the production supply bin with the notch on a select end (or in another selected orientation). Accordingly, it is contemplated that the inversion assembly can be configured to orient the notch at the first end prior to providing the tube to the production supply (provided that the tube is not rejected). For example, optionally, the notch can be on an end of the tube opposite the identifier. Thus, if the identifier reader, when aligned with a first end of the tube, fails to detect the identifier, the computing device 1001 can determine that the notch is on the first end, and the identifier is on the opposing end. In response to determining that the tube is improperly oriented, the computing device 1001 can actuate the inversion assembly to flip the tube so that the identifier is readable via the identifier reader and the tube is oriented with the notch on the select end.

It is further contemplated that other non-image-based inspection devices can be used in addition to or as an alternative for the image acquisition devices. For example, one or more contact gauges can bias against the outer surface and/or longitudinal ends of the tubes. The contact gauge(s) can, for example, measure relative distance between the contacting end of the gauge and a fixed point in space (e.g., a mount for the contact gauge). In some exemplary aspects, a contact gauge can bias against the outer circumferential surface of the tube (e.g., at one or both longitudinal ends and/or at a location between the longitudinal ends) as the tube is rotated about its longitudinal axis to determine out-of-roundness of the tube or longitudinal bending relative to the longitudinal axis. In other exemplary aspects, a contact gauge can bias against an inner surface of the tube at one or each end as the tube is rotated to determine whether the ends are out of round or otherwise damaged. In further exemplary aspects, a surface roughness gauge can be moved across the surface of the tube to detect, for example, cracks or abrasion. Thus, in some aspects, it is contemplated that the inspection system 120 can comprise at least one image acquisition device and at least one non-image-based inspection device as disclosed herein. In further exemplary aspects, it is contemplated that the inspection system 120 can comprise first and second image acquisition devices and first and second non-image-based inspection devices (e.g., contact gauges) as disclosed herein.

Computing Device

Figure 6:
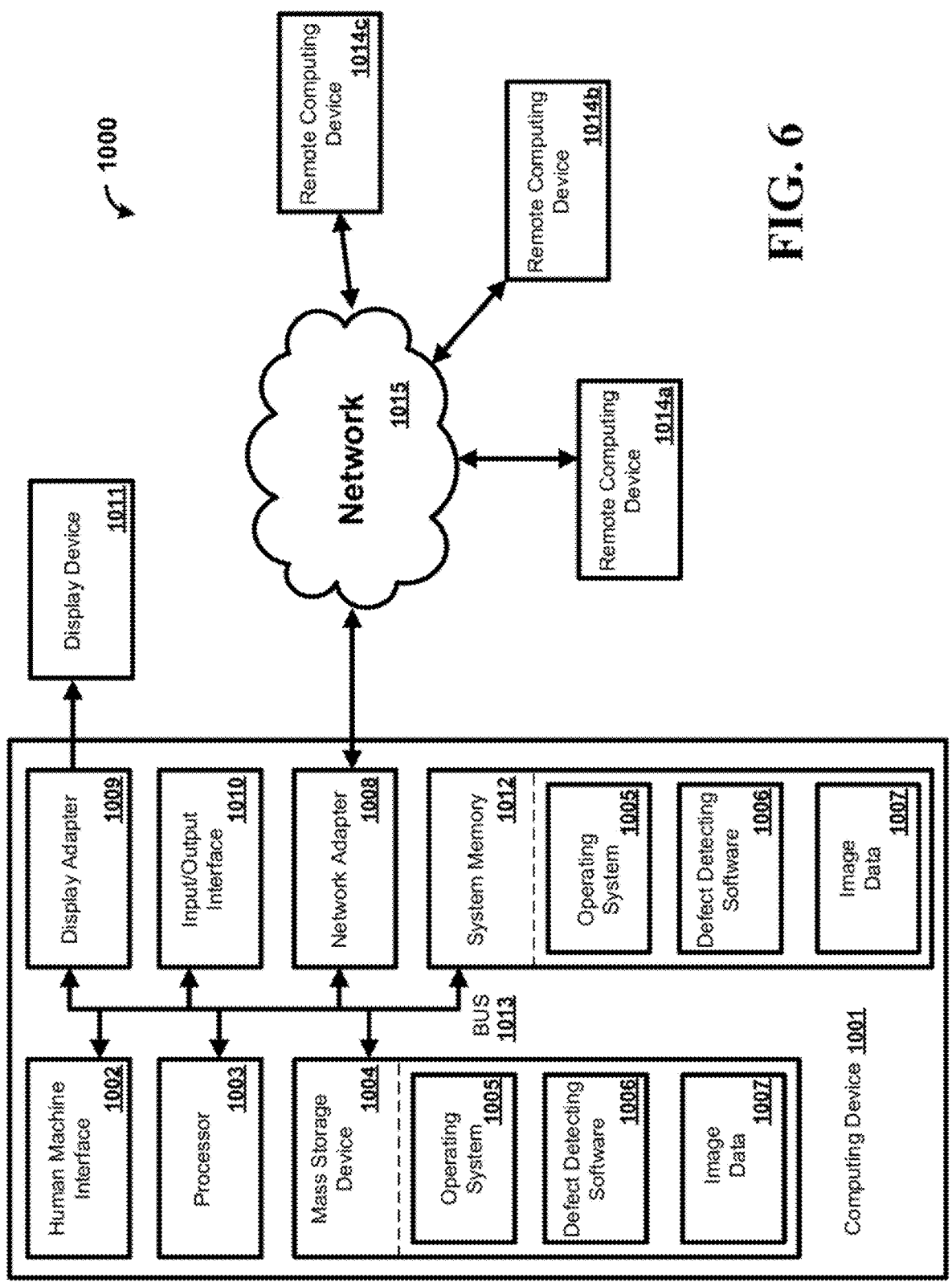
FIG. 6 is a computing device and system for use with the system as in FIG. 1.

FIG. 6 shows a computing system 1000 including an exemplary configuration of a computing device 1001 for use with the system 100. In some aspects, the computing device 1001 can be part of a plant network. In further aspects, it is contemplated that a separate computing device, such as, for example, a tablet, laptop, or desktop computer can communicate with the system 10 and can enable an operator to interface with the system 100.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as image data 1007 (e.g., data from the image acquisition device(s)) and/or program modules such as operating system 1005 and defect detecting software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and defect detecting software 1006 may be stored on the mass storage device 1004. One or more of the operating system 1005 and defect detecting software 1006 (or some combination thereof) may comprise program modules and the defect detecting software 1006. Image data 1007 may also be stored on the mass storage device 1004. Image data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and; or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001. In exemplary aspects, the disclosed computing devices can be in communication with (and form a part of) a Cloud-based network.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system for inspecting a tube, the tube having a first end, an opposing second end spaced along a longitudinal axis, and a circumferential wall extending between the first and second ends, the system comprising: a first image acquisition device that is configured to capture at least one image of the first end of the tube; a second image acquisition device that is configured to capture at least one image of at least a portion of an outer surface of the circumferential wall of the tube; a first conveyor that is configured to position the tube so that the first image acquisition device can capture the at least one image of the first end of the tube and the second image acquisition device can capture the at least one image of at least a portion of the circumferential wall of the tube; at least one processor in communication with the first and second image acquisition devices; and a memory in communication with the at least one processor, wherein the memory comprises instructions that, when executed by the at least one processor, cause the at least one processor to determine, based on the at least one image from the first image acquisition device or the at least one image from the second image acquisition device, if the tube has a flaw.

Aspect 2: The system of aspect 1, further comprising a third image acquisition device that is in communication with the at least one processor and configured to capture an image of the second end of the tube, wherein the memory comprises instructions that, when executed by the at least one processor, cause the at least one processor to determine, based at least in part on the image from the third image acquisition device, if the tube has a flaw.

Aspect 3: The system of aspect 1 or aspect 2, further comprising an inversion assembly that is configured to invert an orientation of the tube about a transverse axis that is perpendicular to the longitudinal axis of the tube.

Aspect 4: The system of aspect 3, wherein the tube has a notch at one of the first and second ends, wherein the memory comprises instructions that, when executed by the at least one processor, cause the at least one processor to determine, based on an image from the second image acquisition device, whether the notch is on the first end, and, if the notch is not on the first end, cause the inversion assembly to invert the orientation of the tube.

Aspect 5: The system of any one of the preceding aspects, further comprising a rotation assembly that is configured to rotate the tube about the longitudinal axis, wherein the second image acquisition device is configured to capture a plurality of images at different rotational positions of the tube.

Aspect 6: The system of any one of the preceding aspects, wherein the flaw is out-of-round-ness of at least one end, a crack, an abrasion, or combinations thereof.

Aspect 7: The system of any one of the preceding aspects, wherein the tube comprises an identifier, the system further comprising an identifier reader.

Aspect 8: The system of aspect 7, wherein the identifier is a radio frequency identifier (RFID) chip, wherein the identifier reader is an RFID reader.

Aspect 9: The system of aspect 7, wherein the identifier is a barcode, wherein the identifier reader is a barcode scanner.

Aspect 10: The system of any one of the preceding aspects, wherein the tube has a profile comprising a number of uses, wherein the memory comprises instructions that, when executed by the at least one processor, cause the at least one processor to: in response to receiving the identifier of the tube from the identifier reader, increase the number of uses of the profile of the tube.

Aspect 11: The system of aspect 10, wherein the memory comprises instructions that, when executed by the at least one processor, cause the at least one processor to: determine whether the number of uses is over a threshold; and reject the tube upon detection of the tube exceeding the threshold.

Aspect 12: The system of any one of the preceding aspects, further comprising a second conveyor, wherein the memory comprises instructions that, when executed by the at least one processor, cause the at least one processor to, upon detecting a flaw in the tube, use the second conveyor to move the tube into a rejection location.

Aspect 13: The system of aspect 12, wherein the second conveyor is contiguous with the first conveyor.

Aspect 14: The system of any one of the preceding aspects, further comprising the tube.

Aspect 15: The system of aspect 14, wherein the tube comprises polymer.

Aspect 16: The system of any one of the preceding aspects, further comprising a supply of production tubes and a supply of new tubes, wherein the memory comprises instructions that, when executed by the at least one processor, cause the at least one processor to: upon determining that the tube has a flaw, cause a new tube from the supply of new tubes to enter the supply of production tubes.

Aspect 17: The system of aspect 16, wherein the memory comprises instructions that, when executed by the at least one processor, cause the at least one processor to: send the tube to the supply of production tubes if a flaw in the tube is not detected.

Aspect 18: A method of inspecting a tube, the tube having a first end, an opposing second end spaced along a longitudinal axis, and a circumferential wall extending between the first and second ends, the method comprising: capturing a first image of the first end of a tube; capturing a second image of at least a portion of an outer surface of the circumferential wall of the tube; receiving, using at least one processor, the first image and the second image; and detecting, using the at least one processor, at least one flaw based on at least one of the first image and the second image.

Aspect 19: The method of aspect 18, further comprising: capturing a third image of the second end of the tube; receiving, using the at least one processor, the third image; and detecting, using the at least one processor, at least one flaw based on the third image.

Aspect 20: The method of aspect 18 or aspect 19, further comprising: detecting a notch at the first end or the second end of the tube; and inverting a longitudinal orientation of the tube about a transverse axis that is perpendicular to a longitudinal axis of the tube.

Aspect 21: The method of any one of aspects 18-20, wherein the second image is of a first portion of the outer surface of the circumferential wall of the tube, the method further comprising: rotating the tube around the longitudinal axis; and receiving, using the at least one processor, a fourth image of a second portion of the outer surface of the circumferential wall of the tube that is rotationally offset from the first portion of the outer surface of the circumferential wall of the tube.

Aspect 22: The method of aspect 21, wherein rotating the tube around the longitudinal axis comprises using a rotation assembly that is in communication with the at least one processor to rotate tube upon receiving a signal from the at least one processor to rotate the tube.

Aspect 23: The method of any one of aspects 18-22, wherein the at least one flaw comprises out-of-round-ness of at least one end, a crack, an abrasion, or combinations thereof.

Aspect 24: The method of any one of aspects 18-23, further comprising: receiving, using the at least one processor, an identifier from the tube; and increasing, using the at least one processor, a number of uses of a profile of the tube.

Aspect 25: The method of aspect 24, further comprising, using the at least one processor, rejecting the tube if the number of uses surpasses a threshold.

Aspect 26: The method of aspect 24 or aspect 25, wherein the identifier is one of a barcode or an RFID.

Aspect 27: The method of any one of aspects 18-26, further comprising moving the tube into an image capture zone where the first and second image acquisition device s capture the respective first and second images.

Aspect 28: The method of any one of aspects 17-27, further comprising, after detecting a flaw in the tube, using the at least one processor to cause movement of the tube to a rejection bin.

Aspect 29: A method comprising: receiving a tube; applying an identifier to the tube; and providing the tube to a supply of production tubes.

Aspect 30: The method of aspect 29, wherein applying the identifier to the tube comprises: applying a surface treatment to a surfaces of the tube; applying an RFID tag to the tube; covering the RFID tag with heat shrink; and applying heat to the tube.

Aspect 31: The method of aspect 29 or aspect 30, wherein applying the identifier to the tube comprises: applying a barcode to the tube.

Aspect 32: A system for inspecting a tube, the tube having a first end, an opposing second end spaced along a longitudinal axis, and a circumferential wall extending between the first and second ends, the system comprising: a first inspection device that is configured to detect a shape of the first end of the tube; a second inspection device that is configured to capture a profile of at least a portion of an outer surface of the circumferential wall of the tube; a first conveyor that is configured to position the tube so that the first inspection device can detect a shape of the first end of the tube and the second inspection device can capture the profile of the at least a portion of the outer surface of the circumferential wall of the tube; at least one processor in communication with the first and second inspection devices; and a memory in communication with the at least one processor, wherein the memory comprises instructions that, when executed by the at least one processor, cause the at least one processor to determine, based on the shape of the first end of the tube or the profile of the at least a portion of the outer surface of the circumferential wall of the tube, if the tube has a flaw.

Aspect 33: The system of aspect 32, wherein each of the first and second inspection devices is an image acquisition device.

Aspect 34: The system of aspect 32, wherein the first inspection device is a contact gauge.

Aspect 35: The system of aspect 34, wherein the second inspection device is a contact gauge.

Aspect 36: The system of aspect 32 or aspect 34, wherein the second inspection device is a surface roughness gauge.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system for inspecting a tube, the tube having a first end, an opposing second end spaced along a longitudinal axis, a circumferential wall extending between the first and second ends, and an identifier, the system comprising:
a first image acquisition device that is configured to capture at least one image of the first end of the tube;
a second image acquisition device that is configured to capture at least one image of at least a portion of an outer surface of the circumferential wall of the tube;
a first conveyor that is configured to position the tube so that the first image acquisition device can capture the at least one image of the first end of the tube and the second image acquisition device can capture the at least one image of at least a portion of the circumferential wall of the tube;
at least one processor in communication with the first and second image acquisition devices;
a memory in communication with the at least one processor, wherein the memory comprises instructions that, when executed by the at least one processor, cause the at least one processor to determine, based on the at least one image from the first image acquisition device or the at least one image from the second image acquisition device, if the tube has a flaw; and
an identifier reader,
wherein the tube has a profile comprising a number of uses, wherein the memory comprises instructions that, when executed by the at least one processor, cause the at least one processor to: in response to receiving the identifier of the tube from the identifier reader, increase the number of uses of the profile of the tube.

2. The system of claim 1, further comprising a third image acquisition device that is in communication with the at least one processor and configured to capture an image of the second end of the tube, wherein the memory comprises instructions that, when executed by the at least one processor, cause the at least one processor to determine, based at least in part on the image from the third image acquisition device, if the tube has a flaw.

3. The system of claim 1, further comprising an inversion assembly that is configured to invert an orientation of the tube about a transverse axis that is perpendicular to the longitudinal axis of the tube.

4. The system of claim 3, wherein the tube has a notch at one of the first and second ends, wherein the memory comprises instructions that, when executed by the at least one processor, cause the at least one processor to determine, based on an image from the second image acquisition device, whether the notch is on the first end, and, if the notch is not on the first end, cause the inversion assembly to invert the orientation of the tube.

5. The system of claim 1, further comprising a rotation assembly that is configured to rotate the tube about the longitudinal axis, wherein the second image acquisition device is configured to capture a plurality of images at different rotational positions of the tube.

6. The system of claim 1, wherein the flaw is out-of-round-ness of at least one end, a crack, an abrasion, or combinations thereof.

7. The system of claim 1, wherein the identifier is a radio frequency identifier (RFID) chip, wherein the identifier reader is an RFID reader.

8. The system of claim 1, wherein the identifier is a barcode, wherein the identifier reader is a barcode scanner.

9. The system of claim 1, wherein the memory comprises instructions that, when executed by the at least one processor, cause the at least one processor to:
determine whether the number of uses is over a threshold; and
reject the tube upon detection of the tube exceeding the threshold.

10. The system of claim 1, further comprising a second conveyor, wherein the memory comprises instructions that, when executed by the at least one processor, cause the at least one processor to, upon detecting a flaw in the tube, use the second conveyor to move the tube into a rejection location.

11. The system of claim 10, wherein the second conveyor is contiguous with the first conveyor.

12. The system of claim 1, further comprising a supply of production tubes and a supply of new tubes, wherein the memory comprises instructions that, when executed by the at least one processor, cause the at least one processor to: upon determining that the tube has a flaw, cause a new tube from the supply of new tubes to enter the supply of production tubes.

13. The system of claim 12, wherein the memory comprises instructions that, when executed by the at least one processor, cause the at least one processor to: send the tube to the supply of production tubes if a flaw in the tube is not detected.

14. A method of inspecting a tube, the tube having a first end, an opposing second end spaced along a longitudinal axis, and a circumferential wall extending between the first and second ends, the method comprising:
- capturing a first image of the first end of a tube;
- capturing a second image of at least a portion of an outer surface of the circumferential wall of the tube;
- receiving, using at least one processor, the first image and the second image; and
- detecting, using the at least one processor, at least one flaw based on at least one of the first image and the second image;
- receiving, using the at least one processor, an identifier from the tube; and
- increasing, using the at least one processor, a number of uses of a profile of the tube.

15. The method of claim 14, further comprising:
- detecting a notch at the first end or the second end of the tube; and
- inverting a longitudinal orientation of the tube about a transverse axis that is perpendicular to a longitudinal axis of the tube.

16. The method of claim 14, further comprising, using the at least one processor, rejecting the tube if the number of uses surpasses a threshold.

17. A system for inspecting a tube, the tube having a first end, an opposing second end spaced along a longitudinal axis, a circumferential wall extending between the first and second ends, and an identifier, the system comprising:
- a first inspection device that is configured to detect a shape of the first end of the tube;
- a second inspection device that is configured to capture a profile of at least a portion of an outer surface of the circumferential wall of the tube;
- a first conveyor that is configured to position the tube so that the first inspection device can detect a shape of the first end of the tube and the second inspection device can capture the profile of the at least a portion of the outer surface of the circumferential wall of the tube;
- at least one processor in communication with the first and second inspection devices;
- a memory in communication with the at least one processor, wherein the memory comprises instructions that, when executed by the at least one processor, cause the at least one processor to determine, based on the shape of the first end of the tube or the profile of the at least a portion of the outer surface of the circumferential wall of the tube, if the tube has a flaw; and
- an identifier reader,
wherein the tube has a profile comprising a number of uses, wherein the memory comprises instructions that, when executed by the at least one processor, cause the at least one processor to: in response to receiving the identifier of the tube from the identifier reader, increase the number of uses of the profile of the tube.

18. A system for inspecting a tube, the tube having a first end, an opposing second end spaced along a longitudinal axis, and a circumferential wall extending between the first and second ends, the system comprising:
- a first image acquisition device that is configured to capture at least one image of the first end of the tube;
- a second image acquisition device that is configured to capture at least one image of at least a portion of an outer surface of the circumferential wall of the tube;
- a first conveyor that is configured to position the tube so that the first image acquisition device can capture the at least one image of the first end of the tube and the second image acquisition device can capture the at least one image of at least a portion of the circumferential wall of the tube;
- at least one processor in communication with the first and second image acquisition devices; and
- a memory in communication with the at least one processor, wherein the memory comprises instructions that, when executed by the at least one processor, cause the at least one processor to determine, based on the at least one image from the first image acquisition device or the at least one image from the second image acquisition device, if the tube has a flaw; and
- a supply of production tubes and a supply of new tubes, wherein the memory comprises instructions that, when executed by the at least one processor, cause the at least one processor to: upon determining that the tube has a flaw, cause a new tube from the supply of new tubes to enter the supply of production tubes.

19. The system of claim 18, wherein the memory comprises instructions that, when executed by the at least one processor, cause the at least one processor to: send the tube to the supply of production tubes if a flaw in the tube is not detected.

* * * * *